Figure 1:
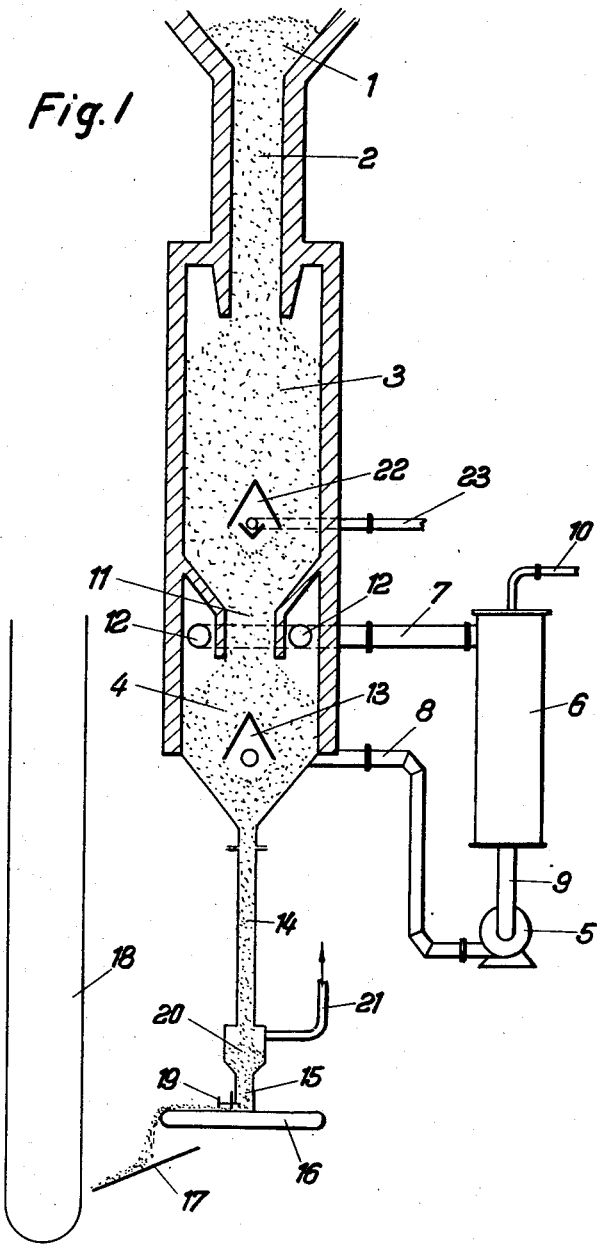

Dec. 4, 1956  F. DANULAT ET AL  2,772,873
METHOD OF OPERATING PEBBLE-TYPE HEAT-CARRIERS
Filed Jan. 30, 1952  3 Sheets-Sheet 2

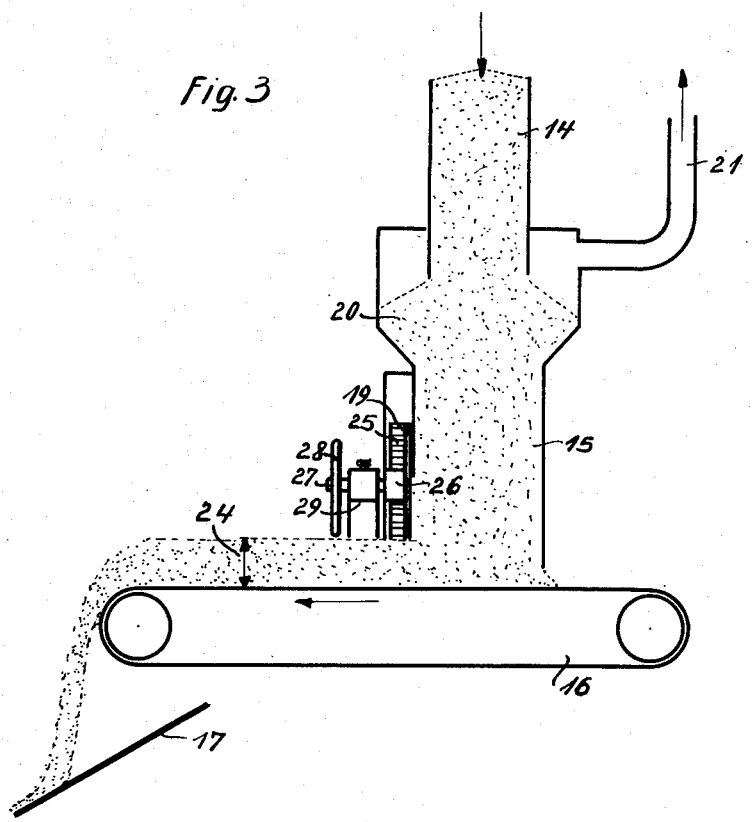

United States Patent Office 2,772,873
Patented Dec. 4, 1956

2,772,873

METHOD OF OPERATING PEBBLE-TYPE HEAT-CARRIERS

Friedrich Danulat, Frankfurt am Main, Paul Schmalfeld, Bad Homburg vor der Hohe, and Paul Rudolph, Oberhausen-Holten, Germany, assignors to Metallgesellschaft Aktiengesellschaft, Frankfurt am Main, Germany, a German corporation Application January 30, 1952, Serial No. 268,988

Claims priority, application Germany February 2, 1951

5 Claims. (Cl. 263—52)

This invention relates to improvements in the use of pebble-type heat carriers. It more particularly relates to an improvement in the discharge of pebble-type heat carriers from the thermal process apparatus for recycling.

A fluid-type heater is known in which pebble-type refractory heat carriers pass consecutively through at least two chambers. The heat carriers are heated by combustion gases or the like in the first chamber and transfer their heat to fluids which are passed in counter-current flow contact with them in the lower chamber. The heat carriers are then discharged from the lower chamber and conveyed back up for passage through the top chamber by a conveying device.

A method for effecting thermal processes as the gasification of finely granular or pulverulent fuels is described in U. S. Patent application Serial No. 172,342, filed July 6, 1950, now Patent No. 2,701,758. According to said application, pebble-type heat carriers of from granular to lumpy or ball size are heated and suspensions of finely divided material to be thermally acted upon are caused to flow through the interspaces between the carrier particles to transmit the heat from the carriers to the suspensions. The heat carriers are then discharged from the thermal process chamber and conveyed by conveying device as, for example, a bucket conveyor or pneumatic conveying system back to be heated and again passed through the thermal process zone. In an embodiment of the method described in the said application the heat carriers are passed downwardly successively through three zones, discharged from the last zone, conveyed back up for passage again through the first zone. In the first zone the carriers are heated by means of combustion gases or the like. The heated carriers then flow through a constriction to the second zone in which a suspension of finely divided fuel to be gasified is passed upward through the interspaces between the heat carrier in exchange therewith and the gas formed is removed from the top of this second zone. After passage through the second zone, heat carrier passes through a constriction and through a third zone through which steam is circulated in counter-current heat-exchange relation to the heat carrier. The steam is superheated, and a portion of the steam passes up to the second zone and acts as gasification agent while the remainder is continuously recycled to a vaporizer where further steam for the circulation is formed. After the passage through this third zone the heat carrier is discharged through a sluicing device, as, for example, a bucket wheel, into a conveyor such as bucket or pneumatic conveying system to be returned to the first zone. The sluicing device allows discharging the heat carrier from the last reaction zone, while maintaining pressure greater than atmospheric, in the last reaction zone.

The use of the mechanically actuated sluicing devices for the discharge of the heat carrier with the maintaining of pressure in the last zone causes a crushing and disintegration of the heat carrier which leads to serious operational difficulties.

One object of this invention is the discharging of pebble-type heat carriers in the last reaction zone without the aforementioned disadvantages.

A further object of this invention is the discharging of pebble-type heat carriers from the last thermal process zone in a uniform and controlled manner without causing a crushing or disintegration of the heat carriers while maintaining a pressure higher than atmospheric in this last zone. These and still further objects will become apparent from the following description read in conjunction with the drawings.

Fig. 1 shows diagramatically a vertical section of an embodiment of an apparatus in accordance with the invention.

Figure 2:
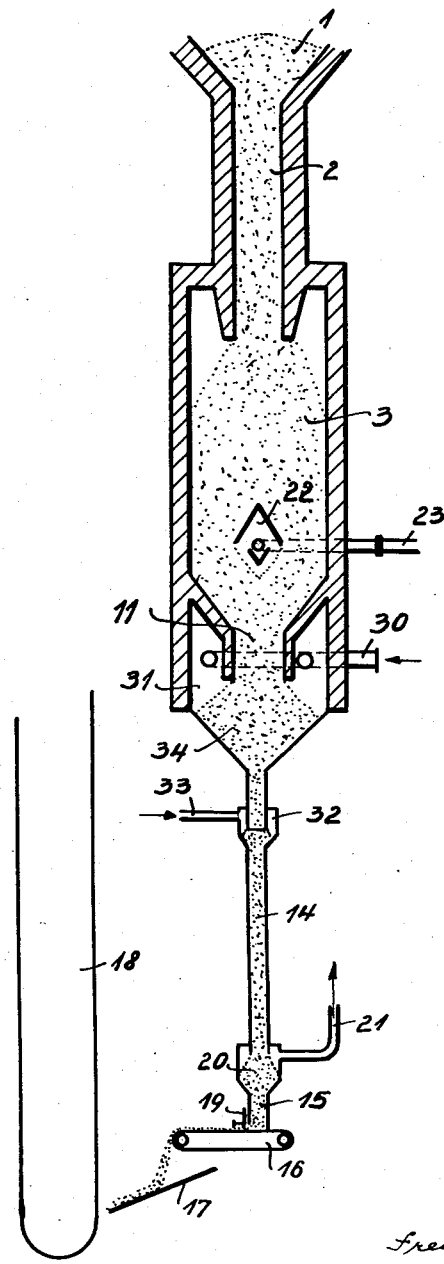

In Fig. 2 another embodiment of an apparatus in accordance with the invention is shown in the same manner.

Fig. 3 shows the lower part of an apparatus in accordance with the invention in an enlarged scale.

In accordance with the invention the heat carriers are discharged from the thermal process apparatus for recycling through an elongated channel having a narrow cross-section, as, for example, a pipe section of suitable length. A funnel-shaped path may be established in the lower portion of the apparatus which leads into the narrow channels and the heat carriers will enter the channel through this funnel-like inlet. The channel should be formed with its bottom portion open and a support should be positioned in spaced relation to the open channel bottom so that the heat carriers will pile up at the open channel discharge end on the support and discharge from this pile between the channel end and the support. It is preferable that the distance from the channel end and the support be made adjustable.

From the pile of heat carrier formed between the open channel discharge end and the support, the heat carriers are introduced into the conveying device in suitable quantities, as, for example, by means of scrapers, rotating plates, conveyor belts or the like. The conveying device which may be, for example, a bucket conveyor, a pneumatic conveying system, operates in the conventional manner and passes the discharge heat carriers for recycling back through the thermal process apparatus. The new discharging of the heat carrier, in accordance with the invention, completely eliminates the use of any members between which the individual heat carriers could be crushed or moved under pressure, and in this way the danger of disintegration is completely eliminated.

The support which is positioned at a spaced distance from the lower open discharge end of the channel may, for example, be in the form of a rotating discharge belt. By adjusting the speed of this belt and its distance from the channel discharge end, the quantity of the heat carriers discharged may be accurately controlled. It is possible by suitable adjustment of the speed of the belt or the distance of the belt from the channel end, to adjust within wide limits the quantity of the heat carriers removed.

In order to maintain the desired gas pressure in the thermal process zone or chamber, from which the heat carriers are discharged to the conveying apparatus, a gaseous medium and preferably steam is introduced into the channel and passed downward therethrough. The gaseous medium is allowed to discharge freely at the end of the channel. As the gaseous medium flows downward through the heat carriers, a pressure loss occurs, so that a pressure differential is brought about between the upper and lower channel ends and a pressure greater than atmospheric, may be maintained in the chamber or zone from which the heat carriers are discharged.

In order to keep the quantity of the downwardly flowing gaseous medium small, the channel should be constructed as long and as narrow as is possible. On the other hand, the channel should not be so long and narrow that bridging or clogging of the individual granules of heat carrier occurs or that the velocity of the heat carrier in the channel becomes too high. If, for example, polygonal or spherically shaped heat carriers having a particle size of about ten millimeters in diameter are used, a discharge channel having a diameter, for example, of 60 to 80 mm. is suitable. The length of the channel is preferably adapted to the excess pressure required in the chamber or zone from which the heat carriers are discharged, and to the permissible quantity of the discharging gaseous medium. In general, channel sections having lengths of between 1 and 4 meters are sufficient even when the excess pressure in the chamber or zone, from which the heat carriers are to be discharged, is as high as one atmosphere in excess of atmospheric pressure. The required speed of gaseous mediums for producing in the channel the necessary loss in pressure which equals the pressure difference of the last chamber compared with the atmosphere, firstly depends on the condition of the gaseous medium, the size and type of the heat carriers and the diameter of the channel. For example: At a speed of the gaseous medium of about 10 m./sec. calculated on the cross section of the channel a pressure difference of about 2000 mm water column per meter pipe length will be obtained. Pressure loss increases with the square of the speed of the gaseous medium.

The gaseous medium used for maintaining the pressure in the chamber or zone, from which the heat carriers are to be discharged, may be introduced near the place in the channel where the heat carriers enter the channel. As mentioned above, steam may advantageously be used as this gaseous medium. The gaseous medium such as steam, after passage through the channel, may be blown out through the lower open end of the channel.

If the zone or chamber from which the heat carriers are to be discharged is already filled with steam, as, for example, in the embodiment set forth in U. S. patent application Serial No. 172,342, in which the gasifying steam is formed in the last chamber, and in which the steam is superheated in this chamber, a portion of this steam may be introduced as the gaseous medium for passage through the channel and maintaining the pressure in the zone or chamber.

The discharging steam or other gaseous medium assumes approximately the same temperature as the temperature of the heat carrier being discharged which, for example, may be between 100 and 600° C. depending on the nature of the thermal process being effected. The gas used as the sealing agent is conducted out through the discharge channel and may be collected at the lower end thereof for further use. If steam is used, for example, it may be compressed after its discharge and used again as a sealing agent or used for the drying or preheating of materials such as fuels used in the thermal process or else for other purposes as, for the gasification or degasification of fuels, the preheating of water, etc.

The apparatus shown in Fig. 1 by way of example is of the type described in U. S. patent application Serial No. 172,342 with a lower chamber from which the heat carrier discharges and through which steam is circulated.

The heat carriers pass from a bunker, heater or the like 1 through channel 2 into zone 3 in which the intended thermal process takes place, whereupon they pass into zone 4. In zone 4 steam is superheated in heat exchange with the heat carriers. The steam is forced by blower 5 to recycle through zone 4 and evaporator 6. This evaporator 6, the blower 5 and the zone 4 are connected with each other by conduits 7, 8 and 9. By the injection of water which flows into evaporator 6 through the line 10, the superheated steam is cooled and additional steam is produced. From zone 4, a part of the steam flows into zone 3 through constriction 11, while another part returns to the evaporator 6 through openings 12 and line 7. Another portion of the steam flows below inlet 13 and passes downward into the discharge channel formed as pipe 14.

From the lower end 15 of pipe 14 the heat carriers flow onto a constantly moving discharge belt 16 which depending on its speed removes a definite quantity of heat carriers. From the discharge belt 16 the heat carriers are introduced, via chute 17, which may be developed as a screen in order to remove the undersize particles, to elevator 18 which returns the heat carriers, for example, directly into the chamber 1. The discharge belt may be horizontal, or may, for example, also be inclined obliquely downwards or upwards. The discharge belt and elevator may, however, also be constructed in a single unit and the heat carriers returned from pipe 14 directly into receptacle 1 by means of this unit. The quantity of heat carriers which is removed from pipe 14 per unit of time can be regulated by the speed of the discharge belt, by the bed height of the heat carrier on the discharge belt or by both of these means combined. For the adjustment of the bed height there may be used, for instance, a dam or weir 19 of adjustable height arranged at the discharge end 15 of the pipe length. Instead of the discharging belt 16, any support means may be positioned at a fixed distance from the discharge end 15 of the pipe 14. The support should be positioned at such a distance from this discharge end 15 that the heat carriers will pile up on the support below the end 15 and be discharged from this pile. The discharging may be effected in any other konwn manner. The rate of discharge may be adjusted for controlling the distance between the support and the discharge end 15.

The reference numbers in Figures 2 and 3 are the same as in Fig. 1.

14 represents the discharge pipe for heat carriers from chamber 4. 15 shows the lower end of pipe 14, being open, where the discharge belt 16 is fitted with the device to draw off the heat carriers. 19 shows the weir, adjustable in height, to adjust the bed height 24 on the discharge belt 16. It is fitted for instance with a spur rack 25 and a gear wheel 26. On shaft 27 of the gear wheel 26 there is a hand wheel 28, whereby shaft 27 is resting on a fixed bearing block 29. By operating handwheel 28 the weir can be moved upward and downward by means of gear wheel 26 and rack 25, whereby bed height 24 changes accordingly.

Pipe 14 is advantageously formed with a widened part 20 shortly before its lower end in which the downward flowing vapor can discharge out of the charge of heat carrier and be led away through line 21. Line 21 can be connected directly to a stack; however it may also lead to an apparatus in which the steam itself or its heat is further used. The pressure with which this steam leaves pipe 14 can be varied, independently of the pressure prevailing in zone 4, by arranging the discharge 20 at a higher or lower position on pipe 14. In this connection steam can also be permitted to flow off at the lower end 15 of pipe 14 or else a second steamtap can be provided shortly above the lower end 15 through which steam can be removed.

The rest of the apparatus is operated in the manner described in said patent application Serial No. 172,342 in which fluids or suspensions are introduced into the chamber 3 through the pipe 23 in the opening 22.

Fig. 2 shows a modification of the apparatus in which chamber 4 of Fig. 1 including its devices for the production and overheating of steam necessary in the process are omitted. The gaseous or vaporous medium necessary for the thermal process is being introduced in this case through pipe 30 into room 31 and passes through constriction 11 into chamber 3. It is advantageous to introduce into the widening 32 of pipe 14 steam or another gaseous or vaporous medium through line 33, the steam flowing downward in pipe 14, thus causing a pressure reduction corresponding to the excess pressure prevalent in chamber 31 as compared with the atmosphere. In order to prevent passage of steam upwards from pipe 33, into room 31 and thence into chamber 3, and in order to likewise prevent part of the gaseous or vaporous medium in room 31 from flowing downward through pipe 14, advantage is taken of the pressure difference between the widening 32 and the low part 34 of room 31. This pressure difference is determined and indicated by known means. Depending on this pressure difference the vapor introduction into widening 32 can be advantageously regulated automatically. In order to indicate by measurement the difference in pressure already in a weak flowing of a gaseous or vaporous medium from 32 to 34, the widening 32 is being fixed in a sufficient distance from lower part 34. For instance this distance should suitably amount to the double or fourfold of the diameter of pipe 14.

What we claim is:

1. In a method for effecting thermal processes in which heat carriers are passed downward through at least one thermal process zone having a pressure in excess of atmospheric, the improvement for discharging the heat carriers from the zone while maintaining the operating pressure in said zone, which comprises establishing a long, narrow, downward discharge path for heat carriers from said zone, and passing heat carriers out of said zone through said discharge path while, simultaneously therewith, passing gaseous medium under pressure through said discharge path in co-current flow with said heat carriers.

2. Improvement according to claim 1, which includes maintaining a pile of heat carriers at the discharge end of said discharge path and removing the heat carriers from this pile.

3. Improvement according to claim 1, which includes recovering the gaseous medium passed through said discharge path.

4. Improvement according to claim 1, in which said gaseous medium is steam.

5. Improvement according to claim 1 which comprises passing said gaseous medium into said thermal process zone above said downward discharge path whereby a portion thereof goes downward in co-current flow with said heat carrier material and a portion flows upward through said zone counter-current with said carrier material.

References Cited in the file of this patent
UNITED STATES PATENTS

| | | |
|---|---|---|
| 2,020,115 | Gray | Nov. 5, 1935 |
| 2,240,347 | Page et al. | Apr. 29, 1941 |
| 2,351,214 | Kaufmann et al. | June 13, 1944 |
| 2,412,135 | Evans | Dec. 3, 1946 |
| 2,412,917 | Simpson et al. | Dec. 17, 1946 |
| 2,432,873 | Ferro et al. | Dec. 16, 1947 |
| 2,441,724 | Simpson | May 18, 1948 |
| 2,468,712 | Kohler | Apr. 26, 1949 |
| 2,490,828 | Newton | Dec. 13, 1949 |
| 2,518,842 | Weber | Aug. 15, 1950 |
| 2,522,639 | Royster | Sept. 19, 1950 |